US007675423B2

(12) United States Patent
Boling et al.

(10) Patent No.: US 7,675,423 B2
(45) Date of Patent: Mar. 9, 2010

(54) MASS OCCUPANT EMERGENCY NOTIFICATION SYSTEM USING SATELLITE RADIO DOWNLINK

(75) Inventors: Brian M. Boling, Knoxville, TN (US); Ronald D. Bishop, Trabucco Canyon, CA (US); Darryl T. Brown, Lenoir City, TN (US); Scott P. Morgan, Northfield, VT (US)

(73) Assignee: Procon, Inc., Knoxville, TN (US)

( * ) Notice: Subject to any disclaimer, the term of this patent is extended or adjusted under 35 U.S.C. 154(b) by 237 days.

(21) Appl. No.: 11/954,434

(22) Filed: Dec. 12, 2007

(65) Prior Publication Data
US 2008/0186135 A1    Aug. 7, 2008

Related U.S. Application Data

(63) Continuation-in-part of application No. 11/693,160, filed on Mar. 29, 2007, which is a continuation-in-part of application No. 10/934,029, filed on Sep. 3, 2004, now Pat. No. 7,215,282, and a continuation-in-part of application No. 11/669,239, filed on Jan. 31, 2007.

(60) Provisional application No. 60/887,726, filed on Feb. 1, 2007, provisional application No. 60/764,419, filed on Feb. 2, 2006.

(51) Int. Cl.
*G08B 23/00* (2006.01)
(52) U.S. Cl. ............ 340/573.1; 340/573.4; 340/539.13; 340/539.32; 340/686.1; 340/990; 340/991; 340/425.5; 455/456.1; 455/457; 455/404.2; 342/357.1
(58) Field of Classification Search .............. 340/573.1, 340/573.4, 539.13, 539.32, 686.1, 990, 991, 340/425.5; 342/537.1; 455/456.1, 457, 404.2
See application file for complete search history.

(56) References Cited

U.S. PATENT DOCUMENTS 5,519,403 A    5/1996    Bickley et al.
5,724,045 A    3/1998    Kawakami (Continued)

*Primary Examiner*—Tai T Nguyen
(74) *Attorney, Agent, or Firm*—Luedeka, Neely & Graham PC

(57) ABSTRACT

A mass occupant notification (MON) system includes an alert source, a first communication network, a MON supervisory system, a second communication network, a satellite radio broadcast network (SRBN) system and a plurality of MON communication units. The alert source, such as a telephone, personal computer or emergency sensor system, generates an alert signal containing information regarding an emergency situation. The first communication network communicates the alert signal from the alert source to the MON supervisory system. The MON supervisory system receives the alert signal and generates an alert message which includes audio message data and destination data. The destination data indicates a destination of the audio message data. The audio message data may contain a voice announcement providing information or instructions regarding the emergency situation. The second communication network communicates the alert message from the MON supervisory system to the SRBN system. The SRBN system extracts the destination data and the audio message data from the alert message, formats the audio message data for transmission via a satellite uplink, and transmits the audio message data via the satellite uplink to SRBN satellites. One or more of the MON communication units receive the audio message data transmitted from the SRBN satellites and generate an analog audio signal based on the audio message data.

20 Claims, 6 Drawing Sheets

U.S. PATENT DOCUMENTS

| | | |
|---|---|---|
| 6,275,164 B1 | 8/2001 | MacConnell et al. |
| 6,825,762 B2 | 11/2004 | Giacopelli et al. |
| 7,215,282 B2 | 5/2007 | Boling et al. |
| 7,486,185 B2 * | 2/2009 | Culpepper et al. ..... 340/539.13 |
| 7,528,714 B2 * | 5/2009 | Schlesier et al. ....... 340/539.13 |
| 2006/0095199 A1 | 5/2006 | Lagassey |

* cited by examiner

MASS OCCUPANT EMERGENCY NOTIFICATION SYSTEM USING SATELLITE RADIO DOWNLINK

This continuation-in-part application claims priority to the following co-pending patent applications, the entire contents of which are incorporated herein by reference:

Ser. No. 60/887,726 filed Feb. 1, 2007 titled GLOBAL EMERGENCY ALERT NOTIFICATION SYSTEM; and Ser. No. 11/693,160 filed Mar. 29, 2007 titled LOCATOR BEACON SYSTEM HAVING GLOBAL COMMUNICATION CAPABILITY which is a continuation-in-part of:

Ser. No. 10/934,029 filed Sep. 3, 2004 titled TWO-WAY DISTRESS ALERT AND EMERGENCY LOCATION APPARATUS AND METHOD which issued as U.S. Pat. No. 7,215,282 on May 8, 2007; and Ser. No. 11/669,239 filed Jan. 31, 2007 titled GLOBAL EMERGENCY ALERT NOTIFICATION SYSTEM which claims priority to provisional patent application No. 60/764,419 filed Feb. 2, 2006 titled GLOBAL EMERGENCY SYSTEM.

FIELD

This invention relates to the field of mass occupant notification systems. More particularly the invention relates to a system for communicating emergency alert messages to occupants of particular geographic locations and areas using individually addressable satellite radio receiver units.

BACKGROUND

Mass occupant notification is the capability to provide real-time information and instructions to people in a particular geographic region, building, area, site, campus, installation, manufacturing plant or other facility using intelligible voice communications. The voice communications may be accompanied by visible signals, text and graphics, and possibly other communication methods. Mass occupant notification (MON) systems, which also may be referred to herein as emergency alert notification systems, are intended for the protection of life by indicating the existence of an emergency situation and instructing people of the necessary and appropriate response and action.

MON systems in use today include Wide Area MON systems and Individual Building MON systems. Individual Building MON systems are used in providing real-time information to personnel within buildings and in the immediate vicinity of buildings. In some cases, Individual Building MON systems are integrated with fire alarm and public address systems in buildings. These systems may include strobe lights as well as siren and speaker systems for indicating and announcing emergency alerts. Wide Area MON systems are used in providing real-time information to personnel in outdoor areas, such as on military installations and campuses. Wide Area MON systems normally include two or more central control stations which may or may not be in communication with individual building MON systems and regional or national command systems. Most Wide Area MON systems generally include outdoor high-power speaker arrays and siren systems which provide voice signals, music and alarm tones. The high-power speaker arrays are usually arranged into zones so that each zone can be individually controlled by a control station.

Some MON systems use terrestrial wireless FM communication links to communicate information between control stations and speaker arrays located in remote portions of the covered area. However, the performance of these FM links has been less than desirable. One problem with the terrestrial FM links is latency in the timing of the alerts messages. For example, speaker arrays located near a control station may receive the alerts slightly sooner than speaker arrays located farther from the control station. This causes the audio messages broadcast from widely separated speaker arrays to be out of phase, which degrades the intelligibility of the audio messages.

What is needed, therefore, is MON system which provides robust and reliable communication links between a source of an alert and widely-scattered remote speaker locations, and which provides alert messages to all of the remote speaker locations at substantially the same time.

SUMMARY

The above and other needs are met by a MON system that includes an alert source, a first communication network, a MON supervisory system, a second communication network, a satellite radio broadcast network (SRBN) system and a plurality of MON communication units. The alert source, such as a telephone, personal computer or emergency sensor system, generates an alert signal containing information regarding an emergency situation. The first communication network communicates the alert signal from the alert source to the MON supervisory system. The MON supervisory system receives the alert signal and generates an alert message based thereon. The alert message may comprise audio message data and destination data, where the destination data indicates a destination of the audio message data. The audio message data may contain a voice announcement which provides information or instructions regarding the emergency situation. The second communication network communicates the alert message from the MON supervisory system to the SRBN system. The SRBN system receives the alert message, extracts the destination data and the audio message data from the alert message, formats the audio message data for transmission via a satellite uplink, and transmits at least the audio message data via the satellite uplink to one or more SRBN satellites. One or more of the MON communication units receive the audio message data transmitted from the SRBN satellites and generate an analog audio signal based on the audio message data.

The SRBN system may comprise a subscriber-based system which, in addition to transmitting audio message data associated with alert messages, transmits entertainment programming to satellite radio receivers registered to subscribers.

In preferred embodiments, the MON supervisory system determines the destination data of the alert message based on information provided in the alert signal, where the destination data indicates which of the MON communication units are to receive the audio message data. The MON supervisory system preferably includes a database which cross-references information regarding the alert source to information regarding the MON communication units, such as types and locations of the MON communication units, whether the MON communication units are fixed or mobile, the areas or zones to which the MON communication units are assigned, types of annunciation equipment attached to each MON communication unit, and a unique identification number assigned to a beacon transmitter that may be associated with a MON communication unit.

In some preferred embodiments of the invention, the MON system includes a high-power speaker array connected to at least one of the MON communication units for amplifying the analog audio signal and emanating a sound signal based thereon.

Another embodiment of the invention provides a MON communication unit that includes a satellite radio receiver, an encoder, a memory device, a decoder, a controller and a high-power speaker array. The satellite radio receiver receives audio message data transmitted from one or more satellites associated with a subscription-based satellite radio broadcast network, decodes the audio message data and generates an analog alert message based on the audio message data. The encoder receives the analog alert message and generates digital audio data which is then stored in the memory device. The decoder receives the digital audio data from the memory device and generates an analog audio signal based thereon. The controller causes the encoder to generate the digital audio data based on a control signal generated by the satellite radio receiver. The controller also causes the decoder to periodically generate the analog audio signal according to a timed cycle, such as in a repeating loop. The high-power speaker array amplifies the analog audio signal and emanate a sound signal based thereon.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
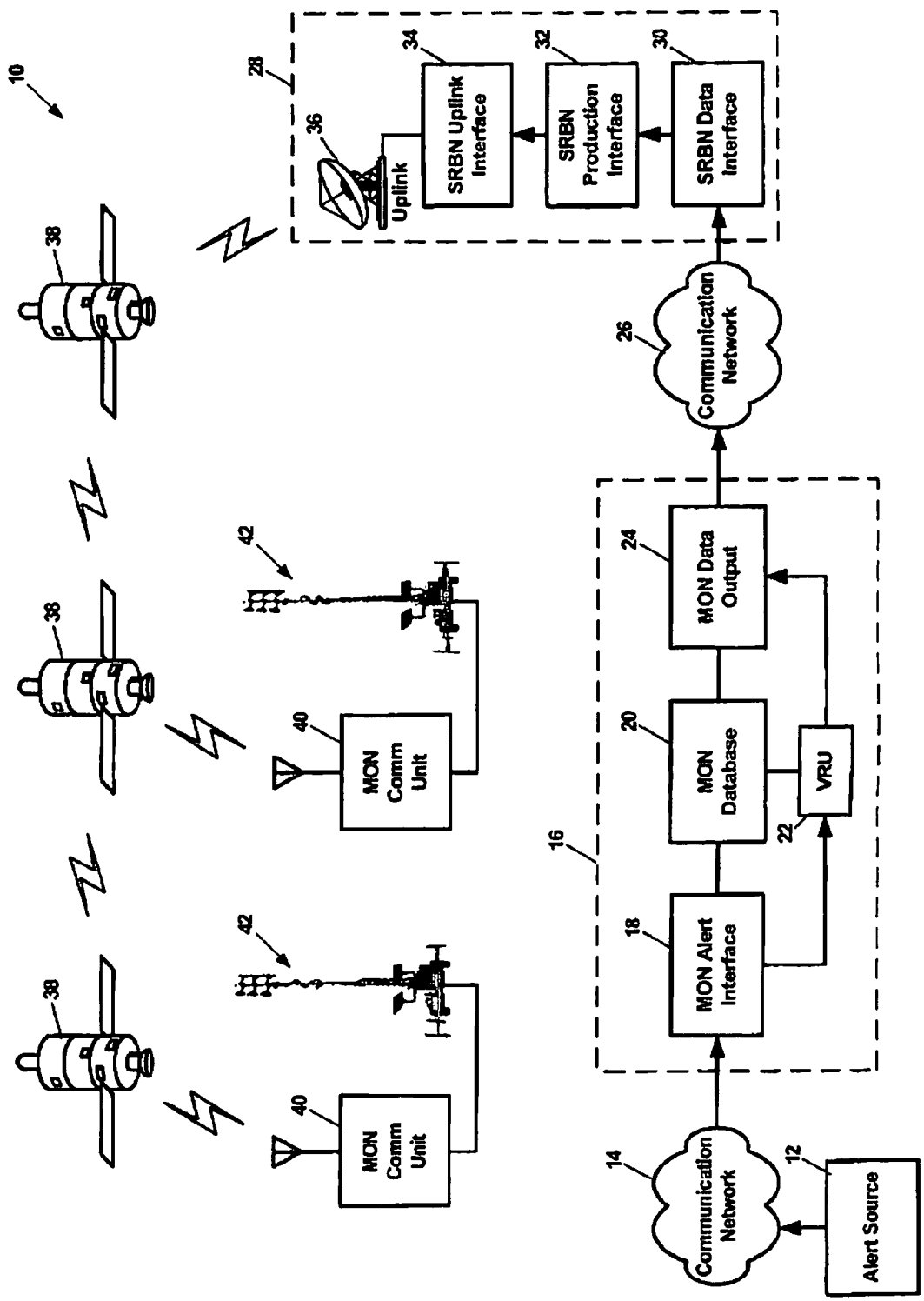
FIG. 1 depicts a mass occupant notification system according to a preferred embodiment of the invention.
Figure 2:
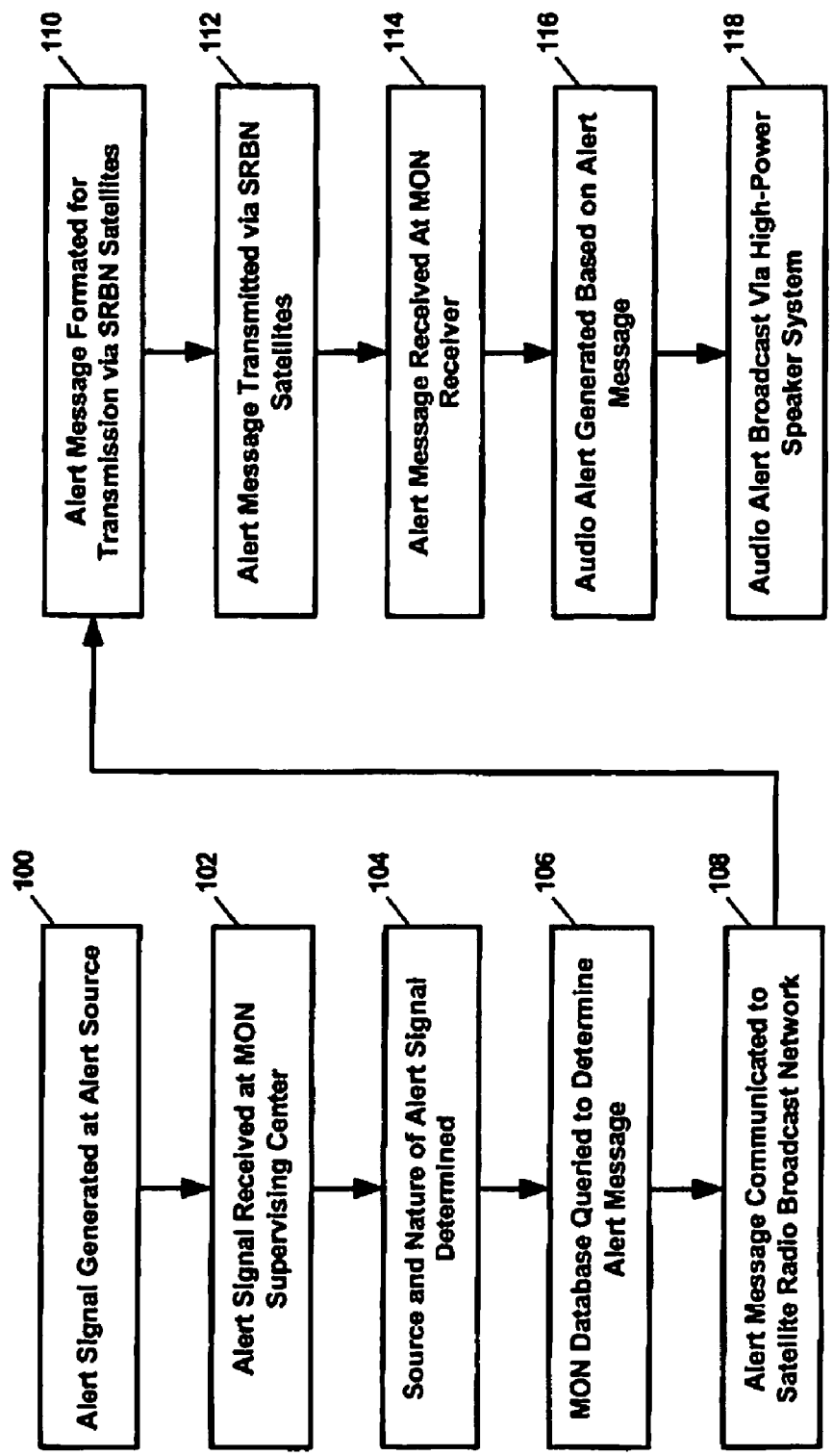
FIG. 2 depicts a method for communicating an alert message via a mass occupant notification system according to a preferred embodiment of the invention.

FIGS. 1 and 2 depict an apparatus and method for implementing a mass occupant notification (MON) system. As shown in FIG. 1, the MON system 10 includes an alert source 12, a first communication network 14, a MON supervisory system 16, a second communication network 26, a satellite radio broadcast network (SRBN) system 28, SRBN satellites 38, MON communication units 40, and annunciation units 42. Each of these components is described in more detail hereinafter.

The alert source 12 comprises a device or system for automatically or manually generating an alert signal (step 100 in FIG. 2). In some embodiments, the alert source 12 may include sensors for detecting an emergency event, conditioning circuitry and processors for receiving and processing signals generated by the sensors, processors for generating alert signals based on the sensor signals, and communication interface circuitry for communicating the alert signals over the first communication network 14. In various embodiments, the sensors may include smoke sensors, heat sensors, hazardous gas sensors, radiation detectors, motion detectors, portal entry detectors and severe weather condition sensors. In other embodiments, the alert source 12 may comprise a communication device, such as a landline telephone, a wireless telephone, a satellite telephone or other personal communication device operated by a person who becomes aware of an emergency situation and reports the situation via the first communication network 14 using the communication device. In yet another embodiment, the alert source 12 may comprise a personal computer operated by a person who becomes aware of an emergency situation and reports the situation via an email, instant message or other computer-to-computer communication over the first communication network 14. In a further embodiment, the alert source 12 may comprise an emergency beacon transmitter which transmits a beacon signal via a search and rescue satellite system, such as the Cospas-Sarsat system. Thus, it will be appreciated that the alert source 12 comprises any apparatus, device or system through which the alert signal is generated and provided to the first communication network 14.

The first communication network 14 comprises a network for communicating electronic signals. The first communication network 14 may be wired, wireless, terrestrial-based, satellite-based, or any combination of these. In some embodiments of the invention, the first communication network 14 comprises a virtual private network (VPN) implemented over a global wide area network, such as the Internet.

The MON supervisory system 16 receives the alert signal from the first communication network 14 (step 102 in FIG. 2), determines the source and nature of the alert signal (step 104), determines what voice message is to be included in the alert message and the intended recipient(s) of the alert message (step 106), and generates the alert message based on the alert signal. The MON supervisory system 16 also communicates the alert message via the second communication network 26 to the SRBN system 28 (step 108). As shown in FIG. 1, the MON supervisory system 16 includes a MON alert interface 18, a MON database 20, a voice recognition unit 22 and a MON data output 24.

The MON alert interface 18 comprises one or more communication ports, processors and memory for receiving and decoding (if necessary) the alert signal sent by the alert source 12. The specific configuration of the MON alert interface 18 is determined by the type of alert signal received. For example, if the alert signal is an alarm signal generated by a fire alarm control panel listed by Underwriter's Laboratory (UL-Listed), the alert signal may be in a standard alarm reporting format, such as the ADEMCO Contact-ID format. In this case, the MON alert interface 18 comprises a decoder for decoding the alert signal to extract pertinent information about the alert, such as the source (account) of the alert signal, an alarm code which indicates the nature of the alert (fire, unauthorized entry, hazardous material, etc.), and the intended recipient of the alert message. If the alert signal is a voice communication generated by a personal communication device, such as a cellular or satellite telephone, the MON alert interface 18 may comprise a communication front end for receiving and decoding the communication signal and a headset/microphone for use by a human operator to speak with personnel at the alert source 12. If the alert signal is an email, instant message or other computer-to-computer communication, the MON alert interface 18 may comprise a personal computer equipped with an appropriate network card and software for receiving and decoding such communications from the communication network 14. If the alert signal is a transmission from an emergency beacon transmitter, the MON alert interface 18 may comprise satellite-based and terrestrial-based components of a search and rescue satellite system, such as the Cospas-Sarsat system described hereinafter.

With continued reference to FIG. 1, the MON database 20 cross-references information regarding alert sources 12 and types of emergencies to information regarding MON communication units 40. Generally, the MON database 20 contains the information necessary to direct an alert message in an appropriate format to the appropriate MON communication unit(s) 40 based at least in part on the source and nature of the alert signal.

In one preferred embodiment, the MON database 20 stores a unique account number (UAN) with which each MON unit 40 is associated. There may be one or many MON units 40 associated with a single UAN. For example, a particular UAN may be assigned to the U.S. Army base at Fort Benning in Georgia, with all of the MON units 40 at Fort Benning associated with that one UAN. Also, there may UAN's assigned to particular geographical zones or buildings within a base or installation. For example, the base at Fort Benning may be divided into ten geographical zones, each identified by a UAN, with each zone having one or more MON units 40 assigned thereto.

The MON database 20 may store information indicating the agency, organization or entity associated with each UAN, the types and locations of the units 40 associated with each UAN, whether those units 40 are fixed or mobile, the area or zone to which each unit 40 is assigned, the type of annunciation equipment, if any, attached to each unit 40 (such as high-power speaker array, sirens or strobes), and the UIN of any beacon transmitter that may be associated with the unit 40.

As shown in FIG. 1, preferred embodiments of the invention include a voice response unit (VRU) 22 which stores digital audio files containing voice recordings of various emergency alert messages. These recordings are stored in association with information indicating the content of the recording and the situations and locations in which the recording is to be used. In some embodiments, the VRU 22 stores various recordings for use at particular military installations, which recordings were made using the voices of the commanders of the installations. For example, a recording may say: "This is General Jones. Evacuate Area 47 immediately. This is not a drill." Similarly, the VRU 22 may store recordings for use at college campuses, where the messages were recorded by the president of the college.

In some embodiments, the VRU 22 includes text-to-speech software which generates a digital audio file of a voice message based on a text input file of the message. For example, the MON alert interface 18 may receive an email or instant message that includes a portion to be converted into a voice message. The MON alert interface 18 extracts the portion of text and provides it to the VRU 22 for processing. The VRU 22 then converts the text to speech and creates a digital audio file of the voice message. This file may then be processed in the same manner as any other stored prerecorded message. The text-to-speech processing feature is particularly applicable to weather alert messages such as may be received from the National Weather Service.

The VRU 22 may also be operable to process live audio from the MON alert interface 18. For example, if the alert signal comprises a live telephone call, the live audio from the call may used in the alert message in the form of streaming digital audio rather than as a prerecorded message.

The MON data output 24 comprises one or more communication ports, processors and memory for receiving and encoding (if necessary) the alert message generated by the VRU 22 and providing the alert message to the communication network 26. The specific configuration and settings of the MON data output 24 are determined by the format of the alert message and the communication protocol of the network 26. In most situations, the alert message will include the digital audio data generated by the VRU 22 with a header which includes the UAN associated with the MON communication units 40 to which the alert message is destined.

The second communication network 26 comprises a network for communicating electronic signals. The second communication network 26 may be wired, wireless, terrestrial-based, satellite-based, or any combination of these. In some embodiments of the invention, the second communication network 26 comprises a virtual private network (VPN) implemented over a global wide area network, such as the Internet. In some embodiments, the first and second communication networks comprise or are part of a single wide-area communication network.

With continued reference to FIG. 1, the SRBN system 28 includes an SRBN data interface 30, an SRBN production interface 32, an SRBN uplink interface 34 and an SRBN uplink 36. In a preferred embodiment of the invention, the components of the SRBN system 28 are located at the production studios of a satellite radio broadcast network, such as the Sirius Satellite Radio studios in New York, N.Y., or the XM Satellite Radio studios in Washington, D.C.

The SRBN data interface 30 comprises one or more communication ports, processors and memory for receiving and decoding (if necessary) the alert message sent by the MON data output 24 via the communication network 26. One of the functions of the SRBN data interface 30 is to extract from the alert message the unique account number (UAN) and the digital audio data containing the live or recorded voice message from the VRU 22. In a preferred embodiment, the SRBN data interface 30 also includes or is part of a computer system with data storage for maintaining a UAN/ESN database. As described in more detail hereinafter, each MON communication unit 40 includes a satellite radio receiver (SRR) that is individually addressable based on a unique electronic serial number (ESN) assigned to the SRR. The UAN/ESN database cross-references each ESN to one or more UAN's with which it is associated. Based on the UAN sent with an incoming alert message, the SRBN system 28 accesses the UAN/ESN database and determines which SRR's (based on their ESN's) are to receive the alert message.

As noted above, there may be one or many ESN's associated with each UAN. Also, each ESN may be associated with more than one UAN. For example, the ESN for a particular MON unit 40 may be included in a list of all the MON units 40 located at a particular military installation. This list of all the MON units 40 is associated with a UAN assigned to the installation. The particular MON unit 40 may also be included in a list of all MON units 40 located within a certain zone of the military installation, where the list of MON units 40 in that zone is associated with a UAN assigned to the zone.

In the preferred embodiment, the output of the SRBN data interface 30 is (1) a list of one or more ESN's that identify the SRR's to which the voice message is directed, and (2) digital audio data containing a recorded voice message or a digital audio stream of a "live" voice message. In an alternative embodiment, the output of the SRBN data interface 30 is the UAN and the digital audio data. This output from the SRBN data interface 30 is provided to the SRBN production interface 32.

The SRBN production interface 32 generally comprises production facilities located at a SRBN studio. The SRBN production interface 32 receives the digital audio data from the alert message and a UAN or list of ESN's associated with a UAN. The SRBN production interface 32 then produces an outgoing alert message on a channel or channels of the SRBN system 28 that will be received by the SRR's associated with the UAN. In one embodiment of the invention, the digital audio message is directed to a single SRBN channel that is designated for all alert message broadcasts, where the message is only decoded by those receivers identified by the ESN's associated with the UAN. In another embodiment, multiple SRBN channels are used for broadcasting alert messages, where a unique SRBN channel is assigned to each UAN. In this embodiment, only those SRR's having an ESN associated with a particular UAN can receive the unique SRBN channel assigned to that UAN. It will be appreciated that since the SRR's are individually addressable, there are many ways by which a particular alert message can be directed by the SRBN system 28 to certain SRR's. The examples provided above set forth two ways in which it may be accomplished. However, the invention is not limited to any particular scheme for addressing the alert message to individual SRR's.

The SRBN uplink interface 34 receives the digital audio data for the alert message (in file format or streaming audio format) and formats the audio data according to the communication protocol used to uplink the audio data to the satellites 38 (step 110 of FIG. 2). The audio codec and modulation technique used in the uplink transmission to the satellites 38 may vary depending on the satellite radio service provider (such as Sirius, XM or Worldspace). For example, the Sirius and XM systems in the continental United States operate according to the Satellite Digital Audio Radio Service (SDARS) protocols. These codec's and modulation techniques are known to those skilled in the art.

As shown in FIG. 1, the SRBN uplink 36 receives the alert message from the SRBN uplink interface 34 and transmits the alert message to one or more of the SRBN satellites 38 (step 112). The SRBN uplink 36 includes radio frequency amplifiers, transmission lines and antenna dishes for transmitting the alert message at about 2.3 GHz (in North America). The SRBN satellites 38 receive the alert message transmission from the uplink 36 and retransmit the alert message into geographical areas covered by the footprints of the satellites' downlink antennas.

Figure 3:
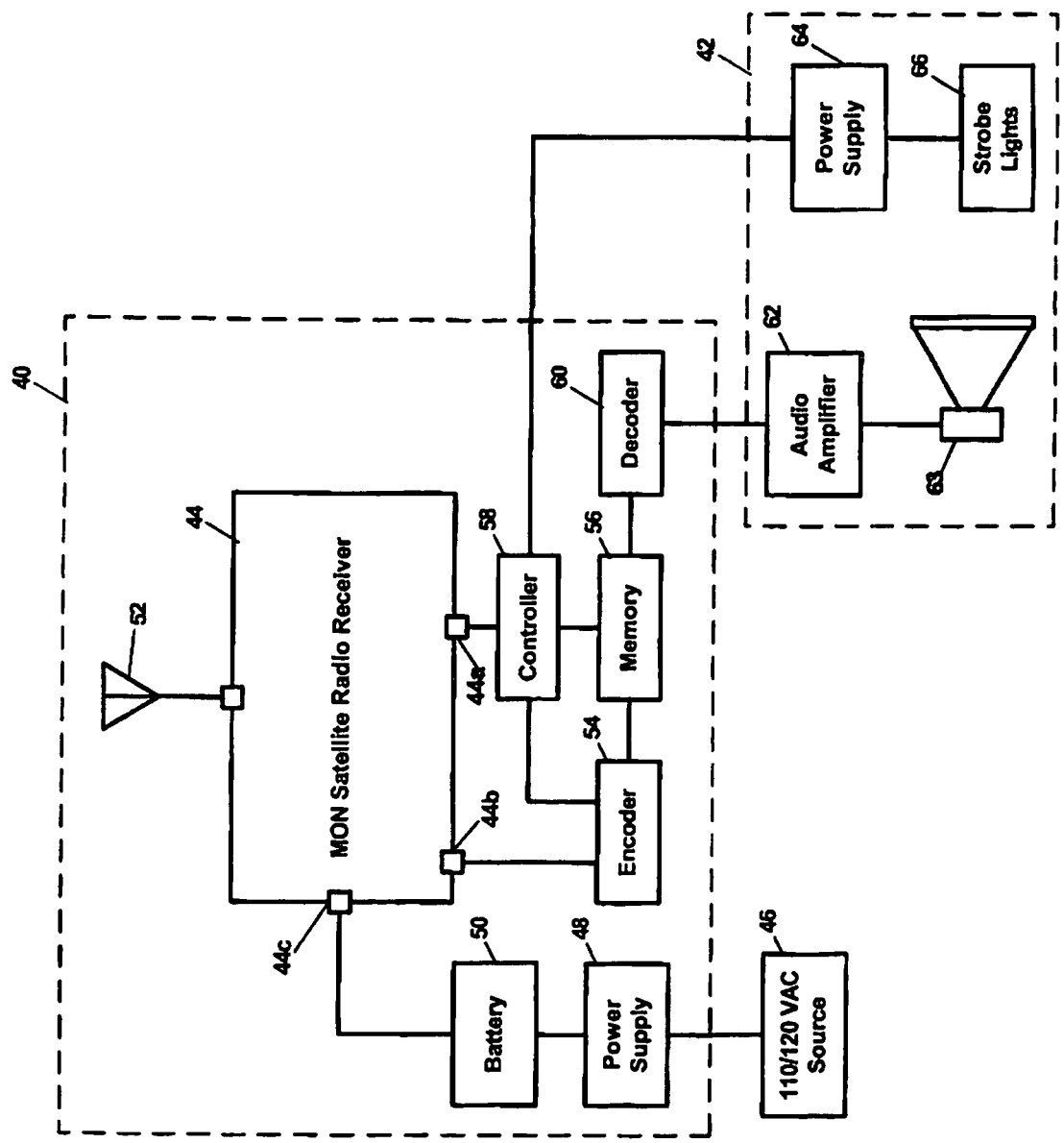
FIG. 3 depicts a wireless communication unit of a mass occupant notification system according to a first embodiment of the invention.
Figure 4:
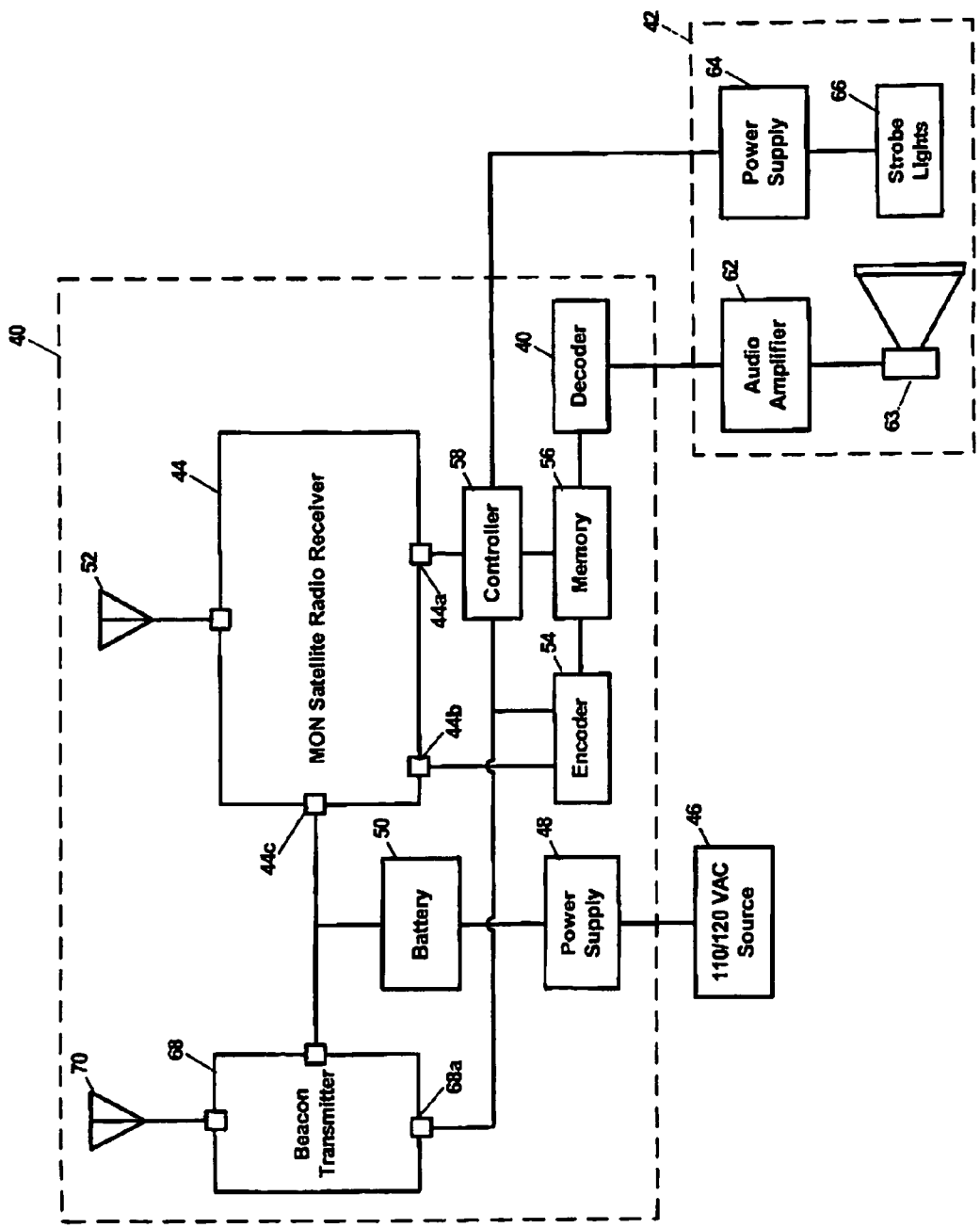
FIG. 4 depicts a wireless communication unit of a mass occupant notification system according to a second embodiment of the invention.
Figure 5:
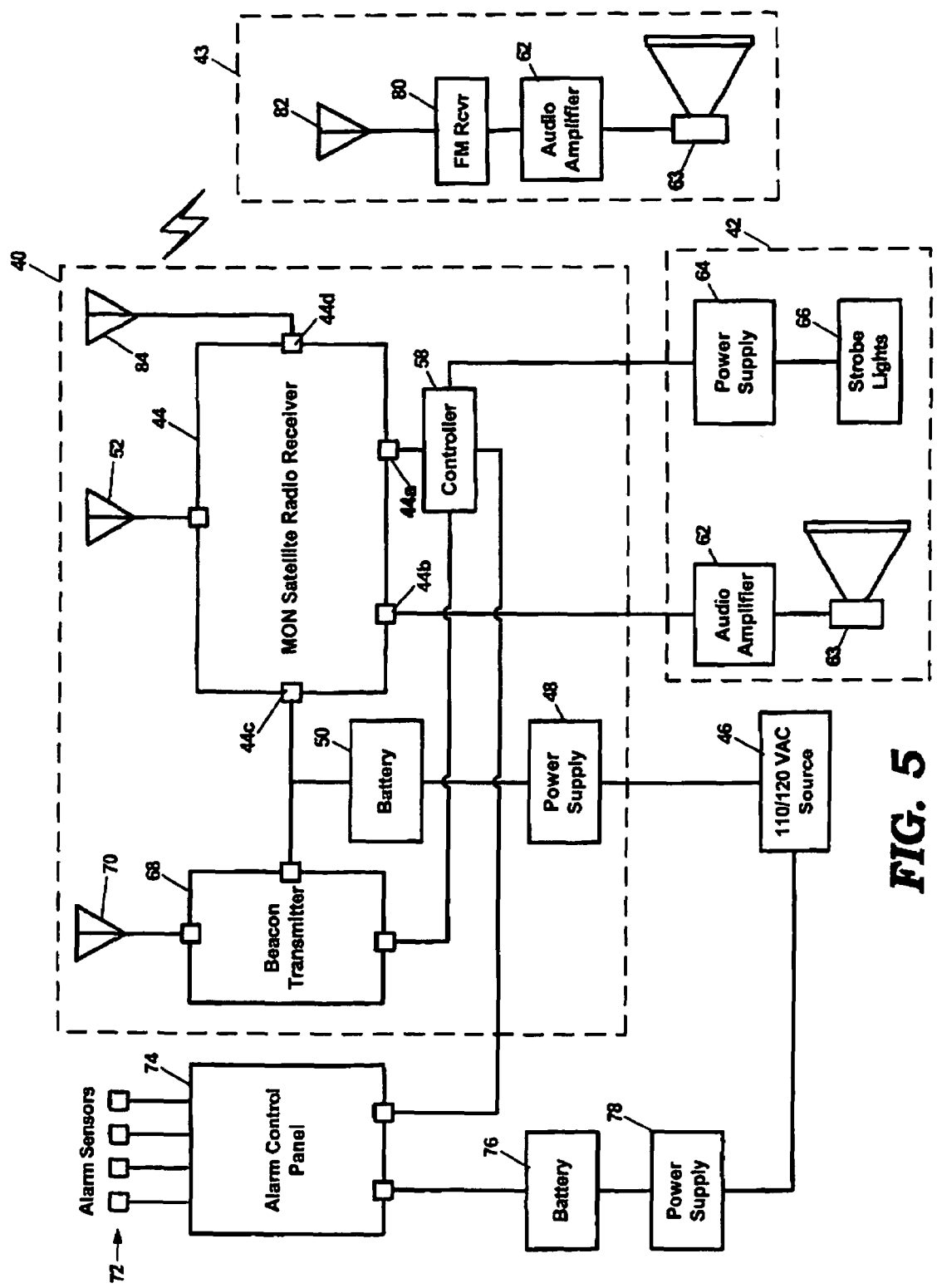
FIG. 5 depicts a wireless communication unit of a mass occupant notification system according to a third embodiment of the invention.

The alert messaged transmitted from the SRBN satellites 38 is received by one or more MON communication units 40 (step 114 of FIG. 2). Various embodiments of a MON communication unit 40 are depicted in FIGS. 3, 4 and 5. In the embodiment of FIG. 3, the MON unit 40 includes an antenna 52 and a satellite radio receiver (SRR) 44 for receiving the alert message transmitted from the SRBN satellites 38 (FIG. 1). The SRR 44 may be a standard FM-modulated receiver unit such as manufactured for Sirius Satellite Radio under model number SC-FM1. Alternatively, the SRR 44 may be a custom-designed unit configured specifically for the MON application. Such custom-designed units may, for example, incorporate an SDARS decoder chipset manufactured by STMicroelectronics under model number STA400A.

In one embodiment of the invention, the SRR 44 is set to monitor one or more SRBN channels that are dedicated to alert message transmissions. When the SRR 44 receives a transmission on any of the dedicated alert channels, the SRR 44 generates a control signal on a controller output port 44a. In a preferred embodiment, the output port 44a is an RS-232 serial data port. The output port 44a is connected to a controller 58. Upon receipt of the control signal on the port 44a indicating a transmission has been received, the controller 58 activates the encoder 54 which is described below.

As shown in FIG. 3, the MON SRR 44 includes an audio output port 44b comprising stereo (left and right channel) audio jacks for outputting stereo analog audio signals. These audio signals are provided to the encoder 54 which includes an analog-to-digital (A/D) converter circuit. Upon receipt of an activation signal from the controller 58, the A/D circuit of the encoder 54 converts the analog audio signals at the audio output port 44b of the SRR 44 into a digital audio data. This digital audio data is then stored in a dynamic memory device 56. When initiated by the controller 58, the digital audio data stored in the memory device 56 is provided to a decoder 60. The decoder 60 receives the digital audio stream from the memory 56 and converts it into an analog audio signal (step 116 in FIG. 2) In effect, the controller 58, encoder 54, memory 56 and decoder 60 act as a digital audio recorder for recording and replaying a copy of the incoming alert message.

The analog audio signal at the output of the decoder 60 is amplified by an audio amplifier 62 and is provided to one or more speakers 63 which generate sound output. In a preferred embodiment of the invention, the amplifier 62 and speakers 63 are components of an alert annunciation system 42, which may also be referred to as a high-power speaker array (HPSA). In a typical application, the amplifier 62 and speakers 63 generate a sound signal of sufficient sound pressure level (SPL) to be heard with intelligibly over a wide area (step 118 in FIG. 2).

In a preferred embodiment of the invention, the controller 58 causes the alert message to be accessed from memory 56, decoded, and played over the speakers 63 according to a timed cycle, such as every ten seconds, for some period of time. Since the MON unit 40 records and replays the alert message, it is not necessary for the alert message to be continuously broadcast over the SRBN system 28 for an extended period of time. This conserves valuable transmission bandwidth in the SRBN system 28.

As shown in FIG. 3, the annunciation system 42 may also include strobe lights 66 and an associated power supply 64 which are activated when the controller 58 detects the receipt of an alert message. Power for the MON unit 40 is preferably provided by a standard 120 VAC power source 46 and power supply 48. A backup battery 50 provides power in case of a power outage.

In the embodiment of FIG. 4, the MON communication unit 40 includes an emergency beacon transmitter unit 68 and associated antenna 70. The beacon unit 68 preferably transmits beacon signal bursts at about 406 MHz which are compatible with a government owned and operated satellite system referred to as Cospas-Sarsat. Cospas-Sarsat is an international satellite system designed to provide distress alert and location data to assist search and rescue operations worldwide. The Cospas-Sarsat system provides support to organizations throughout the world with responsibility for search and rescue operations at sea, in the air or on land. The Cospas-Sarsat system uses spacecraft and ground facilities to detect and locate signals transmitted by distress beacons, such as the beacon unit 68. The position of an activated beacon transmitter and other related information is forwarded to an appropriate Search and Rescue Point of Contact (SPOC) located near the position of the beacon. Further aspects of the operation of the Cospas-Sarsat system are described in U.S. Pat. No. 7,215,282, the entire contents of which is incorporated herein by reference.

As shown in FIG. 4, the beacon unit 68 includes a control input port 68a which is operable to receive control signals from the controller 58. In this embodiment, the SRR 44 may receive a transmission from the SRBN system 28 containing a beacon activation command. The SRR 44 provides a control signal via the output port 44a to the controller 58 which in turn generates a beacon activation signal at the input port 68a of the beacon unit 68. In this manner, the beacon transmitter unit 68 may be remotely activated based on a signal transmitted from the SRBN system 28.

FIG. 5 depicts an embodiment of the invention wherein the MON communication unit 40 with beacon transmitter 68 is configured to receive alarm signals generated by an alarm control panel 74. In this embodiment, the alarm control panel 74, which may be a UL-listed fire alarm panel or other UL-listed alarm panel, receives sensor signals from various alarm sensors 72 connected thereto. The sensors 72 may include sensors for detecting smoke, heat, radiation, hazardous gases, motion, collision or break-in. Based on the alarm signals, the control panel 74 generates alert signals that may be provided to the beacon transmitter 68 under control of the controller 58. The alarm control panel 74 is powered by a power supply 78 and backup battery 76. Various modes of operation of a beacon unit in conjunction with an alarm control panel are described in co-pending and related U.S. patent application Ser. No. 11/669,239 which was filed on Jan. 31, 2007, the entire contents of which are incorporated herein by reference.

With continued reference to FIG. 5, the SRR 44 of this embodiment includes an FM signal output port 44d which outputs an FM signal modulated by the audio signal received by the SRR 44. This FM signal may be transmitted via the antenna 84. Such an FM output is a standard feature on many off-the-shelf satellite radio receiver units, such as the Sirius Satellite Radio model number SC-FM1. The FM output signal from the MON unit 40 may be received by a nearby FM antenna 82 and receiver 80 which are components of a "wireless" annunciation unit 43. In a preferred embodiment of the invention, the annunciation unit 43 operates in substantially the same manner as the annunciation unit 42 described above.

The MON system 10 is useful in any situation where an alert message is to be transmitted to multiple receivers simultaneously. As described above, the MON system 10 as described herein may be used to transmit alert signals and generate voice alert messages simultaneously at various locations within a government installation, military base or university campus. The MON system 10 as described herein could also be used to transmit weather alerts over a wide area that may be affected by a dangerous weather situation. In such an application of the MON system 10, the MON communication units 40 may comprise hand-held or vehicle-mounted satellite radio receivers such as may be used by individuals for personal entertainment. In one embodiment of the MON system 10, these personal satellite radio receivers may be programmed to automatically switch from any other channel to a designated emergency alert channel when the receiver receives a transmission on the emergency channel. As used in this embodiment, the ESN of each personal satellite radio receiver unit is assigned to a particular UAN associated with a particular region of the country in which the receiver unit is registered for use. In this manner, the personal satellite radio receiver units may be addressable to receive only those weather alert messages from the National Weather Service (NWS) that are pertinent to the region in which the receiver is typically used. This embodiment may also be used in conjunction with the Emergency Alert System, which is jointly administered by the Federal Communications Commission (FCC), Federal Emergency Management Agency (FEMA), and the NWS.

Figure 6:
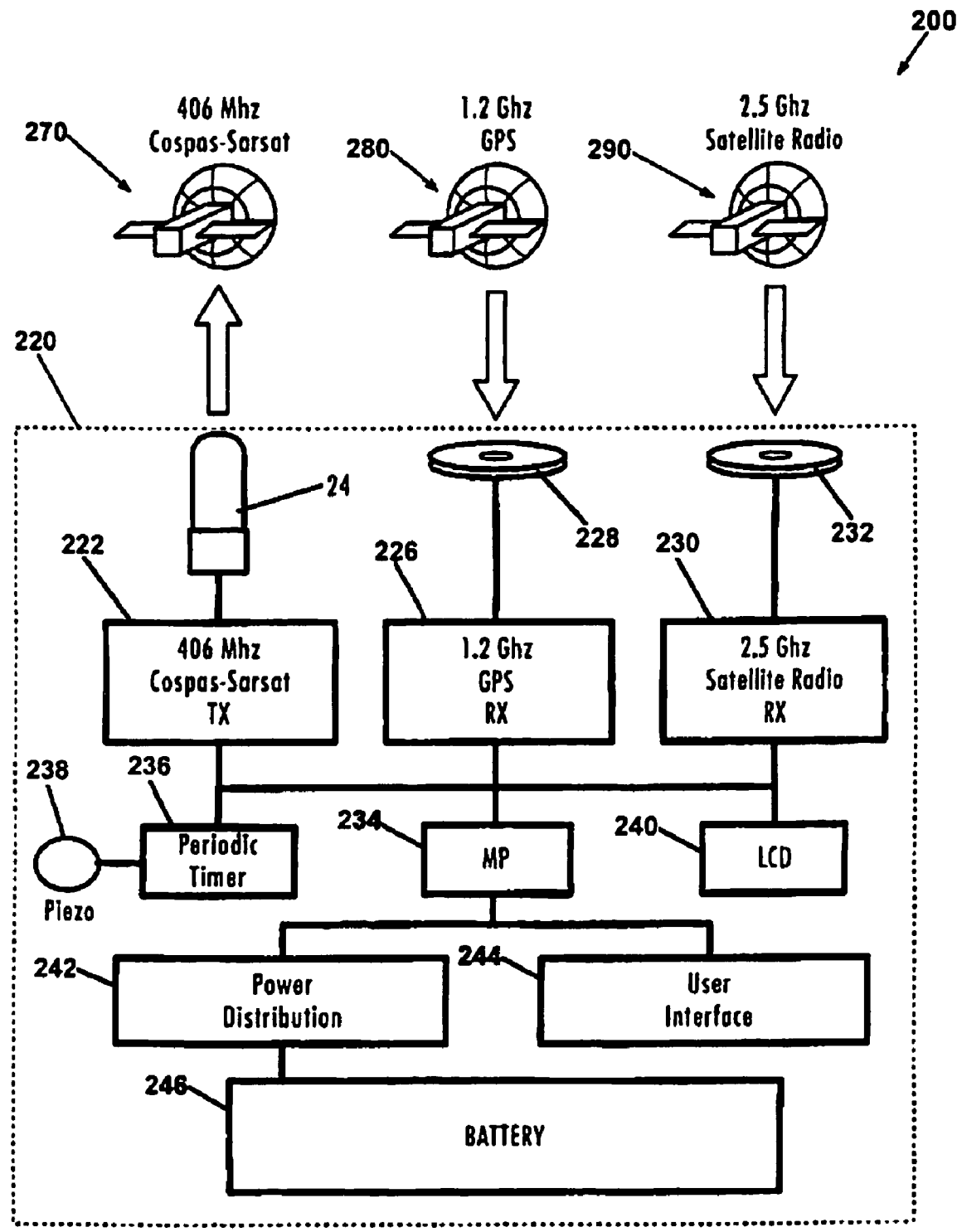
FIG. 6 depicts a portable emergency beacon unit according to an embodiment of the invention.

FIG. 6 depicts a preferred embodiment of a portable two-way distress alert and emergency location device 220. The device 220 includes three radio frequency (RF) modules capable of operating simultaneously to provide communication and location functions in conjunction with three existing satellite systems. The RF modules include an RF transmitter 222 and two RF receivers 226 and 230. In the preferred embodiment, the transmitter 222 generates signals at 406 Megahertz (MHz) that are transmitted via the antenna 224 to the Cospas-Sarsat satellites 270. The device 220 includes a global positioning satellite (GPS) receiver 226, preferably operating at about 1.2 Gigahertz (GHz). By way of the patch antenna 228, the GPS receiver 226 receives signals transmitted from a constellation of government owned and operated location based services (LBS) satellites 280. Based on signals received from at least three satellites, the GPS receiver 226 generates longitude/latitude data corresponding to the location of the device 220. In the preferred embodiment of the invention, the GPS receiver 226 processes the longitude/latitude results into a National Marine Electronics Association standard (NMEA) format to be provided to the transmitter 222 for transmission to the Cospas/Sarsat satellites 270.

The device 220 also includes a satellite radio receiver 230, preferably operating at about 2.3-2.5 GHz for receiving signals in the Digital Audio Radio Service (DARS) band. In the preferred embodiment, the satellite radio receiver 230 receives coded RF signals transmitted from satellites 290 that are privately owned and operated, such as by Sirius Satellite Radio, XM Satellite Radio, or WorldSpace. These signals are received preferably via a patch antenna 232. In alternative embodiments, the receiver 230 operates in the 1.467-1.492 GHz segment of the L-Band spectrum, which is also allocated for digital audio broadcasting in some parts of the world.

As shown in FIG. 1, the device 220 includes a microprocessor 234 that controls the operation of the various RF modules 222, 226 and 230 and compiles the information needed to transmit data in the Cospas-Sarsat system and receive data in the GPS and satellite radio systems. A display device 240, such as an LCD screen, is provided to display messages and options for the user of the device 220. Timing of various operations of the device 220 is controlled by a periodic timer 236. The device 220 includes a user interface 244 that allows the user to activate the device 220 and to select responses to incoming messages and locally-generated prompts. Power to the device 220 is preferably supplied by one or more batteries 246. Distribution of power from the battery 246 is controlled by the power distribution module 242.

Further aspects the structure and operation of various embodiments of the device 220 are described in U.S. Pat. No. 7,215,282 titled TWO-WAY DISTRESS ALERT AND EMERGENCY LOCATION APPARATUS AND METHOD which issued on May 8, 2007, the entire contents of which are incorporated herein by reference.

In one preferred embodiment of the invention, the beacon transmitter 222 of the device 220 may be remotely activated by way of a signal received by the satellite radio receiver 230. This functionality is particularly useful in situations wherein the device 220 is used as a personal locator beacon. For example, if the device 220 is carried by a hiker in a remote area, and the hiker does not arrive at a preplanned destination by a predetermined time, and no other means is available to communicate with the hiker, a signal transmitted through the satellite radio system 290 may be used to activate the beacon transmitter 222. Thus, if the hiker has suffered an injury and is unconscious or otherwise unable to manually activate the beacon transmitter 222, the transmitter 222 can be remotely activated to transmit its location through the Cospas-Sarsat system 270.

In preferred embodiments of the invention, the transmission of the remote activation signal may originate from the satellite radio broadcast network 28 as depicted in FIG. 1. This transmission may be triggered by an activation communication received via the communication network 26. The activation communication may originate from an alert source 12 and be communicated through the MON supervisory system 16. Alternatively, the alert source 12 may communicate directly with the SRBN 28. In various embodiments, the alert source 12 may be a computer connected to the communication network 14 or 26 which accesses a website maintained by the MON supervisory system 16 or the SRBN 28. Through the website interface, a user may specify information used in identifying the device 220, such as the serial number of the device 220 or the name of a person to which the device 220 is registered. This information may be maintained in the MON database 20 or in a database associated with the SRBN 28. In other embodiments, the alert source 12 may be a telephone through which a person calls the MON supervisory system 16 or the SRBN 28 to initiate activation of the beacon transmitter 222.

In an alternative embodiment, the beacon transmitter 68 of the MON communication units 40 shown in FIGS. 4 and 5 may be remotely activated by way of a signal received by the MON satellite radio receiver 44. Using this embodiment, the beacon transmitter 68 may be remotely activated in situations where local activation of the beacon is not preferable or possible.

Preferably, the activation transmission from the SRBN 28 to the device 220 includes a data string encoded to confirm that the SRBN 28 has received a request for activation of the particular device 220. The satellite radio receiver 230 decodes this data string and provides a corresponding signal to the microprocessor 234 indicating that an activation transmission has been received. Upon receipt of the signal from the satellite radio receiver 230, the microprocessor 234 generates a control signal which activates the GPS receiver 226 to begin acquiring location coordinates and activates the beacon transmitter 68 to begin transmitting the coordinates. At this point, the piezo 238 may also sound to alert the user of the device 220 that the beacon transmitter 222 is being remotely activated.

In a portable locator beacon unit, such as depicted in FIG. 6, the satellite radio receiver 230 and the microprocessor 234 may be constantly receiving power in a standby state. The other system components will begin receiving power once an activation transmission has been received by the satellite radio receiver 230. In this manner, battery power is conserved.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A mass occupant notification system comprising:
   an alert source for generating an alert signal containing information regarding an emergency situation;
   a first communication network in communication with the alert source, the first communication network for communicating the alert signal from the alert source;
   a mass occupant notification supervisory system in communication with the first communication network, the mass occupant notification supervisory system for receiving the alert signal and generating an alert message based thereon, wherein the alert message comprises audio message data and destination data, the destination data indicating a destination of the audio message data;
   a second communication network in communication with the mass occupant notification supervisory system, the second communication network for communicating the alert message from the mass occupant notification supervisory system;
   a satellite radio broadcast network system in communication with the second communication network, the satellite radio broadcast network system for receiving the alert message, extracting the destination data and the audio message data from the alert message, formatting the audio message data for transmission via a satellite uplink, and transmitting at least the audio message data via the satellite uplink to one or more satellite radio broadcast network satellites; and
   a plurality of mass occupant notification communication units, one or more of which are operable to receive the audio message data transmitted from the satellite radio broadcast network satellites and generate an analog audio signal based on the audio message data.

2. The mass occupant notification system of claim 1 further comprising a high-power speaker array connected to at least one of the mass occupant notification communication units for amplifying the analog audio signal and emanating a sound signal based thereon.

3. The mass occupant notification system of claim 1 wherein the alert source includes sensors selected from the group consisting of smoke sensors, heat sensors, hazardous gas sensors, radiation detectors, motion detectors, portal entry detectors and severe weather condition sensors.

4. The mass occupant notification system of claim 1 wherein the alert source comprises a communication device operated by properly designated personnel, the communication device selected from the group consisting of a landline telephone, a wireless telephone, a cellular telephone and a satellite telephone.

5. The mass occupant notification system of claim 1 wherein the alert source comprises a computing device operated by properly designated personnel, the computing device selected from the group consisting of a server computer, a personal computer, laptop computer, notebook computer, handheld computer and personal data assistant.

6. The mass occupant notification system of claim 1 wherein the alert source comprises a beacon transmitter unit which is operable in conjunction with a search-and-rescue satellite communication system operated by properly designated personnel.

7. The mass occupant notification system of claim 1 wherein the mass occupant notification supervisory system determines the destination data of the alert message based on information provided in the alert signal, where the destination data indicates which of the mass occupant notification communication units are to receive the audio message data.

8. The mass occupant notification system of claim 1 wherein the mass occupant notification supervisory system determines the audio message data based at least in part on information provided in the alert signal, where the audio message data includes an announcement related to an emergency situation at the destination of the alert message.

9. The mass occupant notification system of claim 1 wherein the mass occupant notification supervisory system includes a database which cross-references information regarding the alert source to information regarding one or more of the mass occupant notification communication units.

10. The mass occupant notification system of claim 9 wherein the database cross-references an account number associated with an alert source to information regarding one or more of the mass occupant notification communication units that are associated with the account number.

11. The mass occupant notification system of claim 9 wherein the database contains information regarding one or more of the mass occupant notification communication units, including information selected from the group consisting of types and locations of the mass occupant notification communication units, whether the mass occupant notification communication units are fixed or mobile, the areas or zones to which the mass occupant notification communication units are assigned, types of annunciation equipment attached to each mass occupant notification communication unit, and a unique identification number assigned to a beacon transmitter that may be associated with a mass occupant notification communication unit.

12. The mass occupant notification system of claim 1 wherein the first communication network and the second communication network are components of a global communication network.

13. The mass occupant notification system of claim 1 wherein the satellite radio broadcast network system comprises a subscriber-based system which, in addition to transmitting audio message data associated with alert messages, transmits entertainment programming to satellite radio receivers registered to subscribers.

14. The mass occupant notification system of claim 1 wherein one or more of the mass occupant notification communication units comprise:
  a satellite radio receiver for receiving the audio message data transmitted from the satellite radio broadcast network satellites, decoding the audio message data and generating an analog alert message based on the audio message data;
  an encoder for receiving the analog alert message and generating digital audio data based thereon;
  a memory device for storing the digital audio data; and
  a decoder for receiving the digital audio data from the memory device and generating the analog audio signal based thereon.

15. The mass occupant notification system of claim 14 wherein one or more of the mass occupant notification communication units further comprise a controller for causing the encoder to generate the digital audio data based on a control signal generated by the satellite radio receiver.

16. The mass occupant notification system of claim 15 wherein the controller causes the decoder to periodically generate the analog audio signal according to a timed cycle.

17. A mass occupant notification system comprising:
  means for generating an alert signal containing information regarding an emergency situation;
  means for communicating the alert signal via a first communication network;
  means for receiving the alert signal from the first communication network and generating an alert message based thereon, wherein the alert message comprises audio message data and destination data, the destination data indicating a destination of the audio message data;
  means for communicating the alert message via a second communication network;
  a satellite radio broadcast network system for receiving the alert message from the second communication network, extracting the destination data and the audio message data from the alert message, formatting the audio message data for transmission via a satellite uplink, and transmitting at least the audio message data via the satellite uplink to one or more satellite radio broadcast network satellites; and means for receiving the audio message data transmitted from the satellite radio broadcast network satellites and generating an analog audio signal based on the audio message data.

18. The mass occupant notification system of claim 17 wherein the means for receiving the alert signal from the first communication network and generating the alert message comprises a mass occupant notification supervisory system including:
  an alert interface for receiving the alert signal from the first communication network;
  a database which cross-references information regarding a source of the alert signal to information regarding one or more intended destinations of the audio message data;
  a voice response unit for generating the audio message data based on information contained in the alert signal; and
  a data output for outputting the audio message data and the destination data for communication via the second communication network.

19. The mass occupant notification system of claim 17 wherein the means for receiving the audio message data transmitted from the satellite radio broadcast network satellites and generating an analog audio signal based on the audio message data comprise:
  a satellite radio receiver for receiving the audio message data transmitted from the satellite radio broadcast network satellites, decoding the audio message data and generating an analog alert message based on the audio message data;
  an encoder for receiving the analog alert message and generating digital audio data based thereon;
  a memory device for storing the digital audio data; and
  a decoder for receiving the digital audio data from the memory device and generating the analog audio signal based thereon.

20. A method for mass occupant notification comprising:
  (a) generating an alert signal containing information regarding an emergency situation;
  (b) communicating the alert signal via a first communication network;
  (c) generating an alert message based on the alert signal, wherein the alert message comprises audio message data and destination data, the destination data indicating a destination of the audio message data;
  (d) communicating the alert message via a second communication network;
  (e) extracting the destination data and the audio message data from the alert message at a satellite radio broadcast network system;
  (f) formatting the audio message data for transmission via a satellite uplink;

(g) transmitting at least the audio message data via the satellite uplink to one or more satellites associated with the satellite radio broadcast network;

(h) receiving the audio message data transmitted from the satellite radio broadcast network satellites; and (i) generating an analog audio signal based on the audio message data.

\* \* \* \* \*